United States Patent [19]

Sterner

[11] 3,949,909
[45] Apr. 13, 1976

[54] ANIMAL FOOD DISPENSING APPARATUS

[76] Inventor: Karl Thore Sterner, Fack, S-781 08 Borlange 8, Sweden

[22] Filed: Oct. 21, 1974

[21] Appl. No.: 516,590

[52] U.S. Cl. .............................. 222/199; 119/56 A
[51] Int. Cl.² ................. B65G 65/70; A01K 39/014
[58] Field of Search ........... 222/199, 200, 460, 461, 222/196; 119/56 A

[56] References Cited
UNITED STATES PATENTS

| | | | |
|---|---|---|---|
| 2,045,502 | 6/1936 | Wade | 222/199 X |
| 2,420,812 | 5/1947 | Brunner | 222/199 X |
| 2,583,862 | 1/1952 | Lichtenstein | 222/199 UX |
| 3,193,153 | 7/1965 | Hosokawa | 222/199 |
| 3,224,649 | 12/1965 | Gunto | 222/199 |
| 3,542,251 | 11/1970 | Pfeuffer | 222/200 X |

*Primary Examiner*—Robert B. Reeves
*Assistant Examiner*—Frederick R. Handren
*Attorney, Agent, or Firm*—Dressler, Goldsmith, Clement & Gordon, Ltd.

[57] ABSTRACT

An animal food dispensing apparatus comprising a container with a bottom opening and an insert suspended in the opening. The insert is in the form of a sleeve open at its upper and lower ends. A vibrator is mounted within the sleeve and has a vibrating portion extending through the lower sleeve opening. The vibrating portion is attached to a food dispensing plate which extends across the lower sleeve opening and is spaced below it. When the vibrator is energized, food will fall from the edge of the plate.

17 Claims, 1 Drawing Figure

U.S. Patent  April 13, 1976  3,949,909
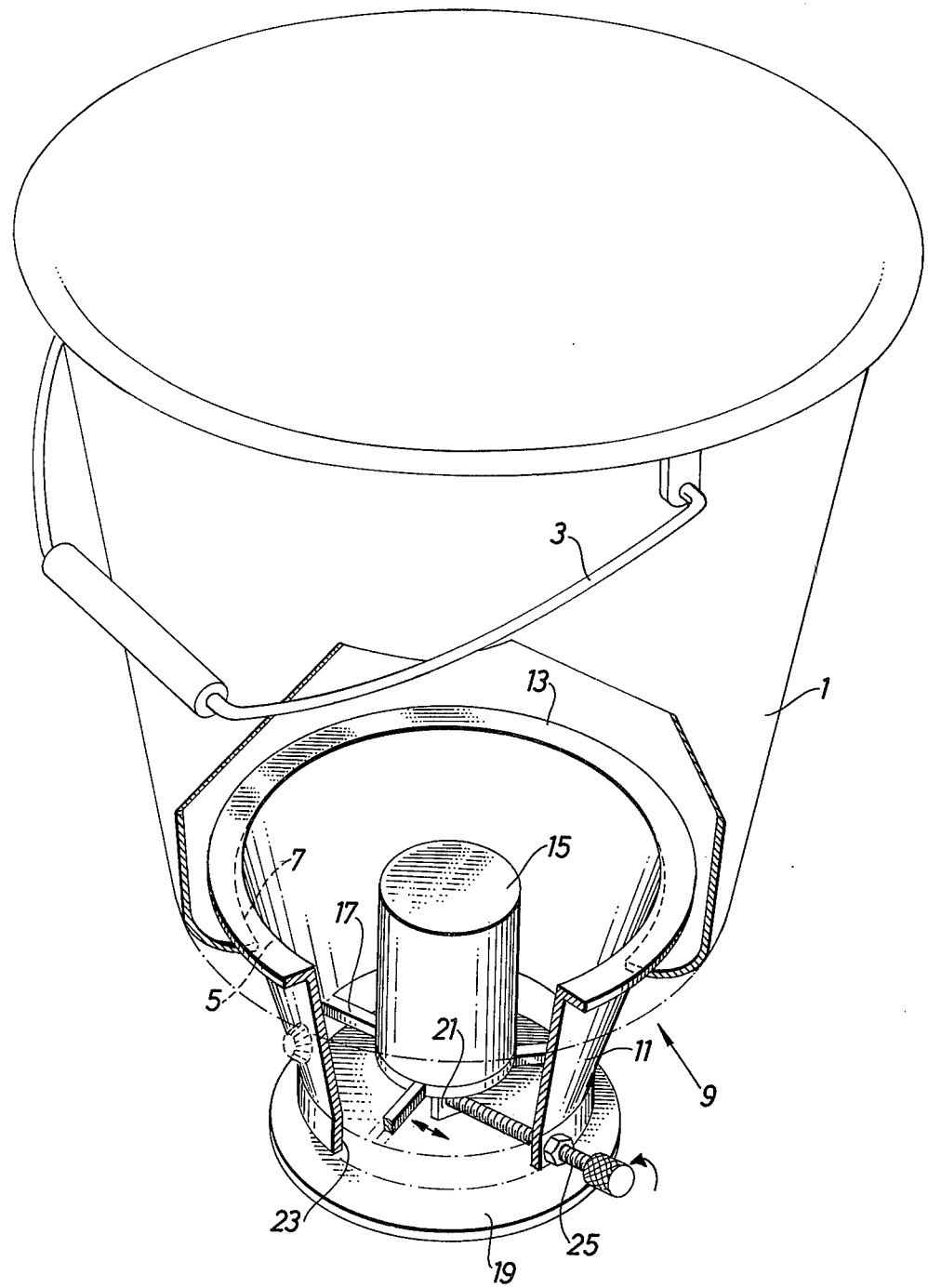

ANIMAL FOOD DISPENSING APPARATUS

The present invention relates to an apparatus for dispensing food in powder, granular or lump form to animals, such as fish, said apparatus comprising a container having an opening arranged in the bottom thereof. Animals food dispensing apparatus are previously known. One such apparatus comprises a food container in which there is arranged a device which is connected to a source of air under pressure and which, upon being activated, ejects a portion of food onto the surface of the water beneath the container. The operation of this apparatus requires a source of air under pressure, valves and other expensive and complicated devices, and hence its use has been restricted.

The present invention is intended to at least substantially eliminate the disadvantages encountered with previously known apparatus and to provide an inexpensive, simple and effective food dispensing apparatus of the type described, wherein a vibrator arranged within the container is provided with a vibrating portion which is arranged to coact with a food dispensing plate which is located at a pre-determined distance from and beneath said opening and the area of which exceeds the area of said opening, the arrangement being such that when the vibrator is activated a constant amount of food per unit of time is dispensed over the edge of the plate.

The invention will now be described in more detail with reference to the acoompanying drawings, the single FIGURE of which is a perspective partly cut-away view of a dispensing apparatus constructed in accordance with the invention. The specific embodiment of this invention will be described with reference to its use as a fish feeder, although it is not restricted to such use.

In the drawing the reference 1 identifies the container, which is arranged to contain a quantity of granular fish food. The container 1 is provided with a handle 3 by means of which said container can be suspended, by means of a rope and hook, for example, over a pond or pool containing fish or fish-sporn. In the bottom of the container 1, which may comprise a conventional plastics bucket or pail is arranged a circular opening 5. The edge of the opening is shown by reference 7. Arranged in the container 1 is an insert unit 9 comprising a sleeve 11 having the form of a hollow frusto-conical member the upper portion of which is provided with an annular flange 13, a vibrator 15 attached to a three armed holder device 17, which may suitably be made integral with the sleeve 11, and a circular food dispensing plate 19 which in the illustrated case is attached to a vibrating portion 21 of the vibrator 15 by means of a screw or the like.

The vibrating portion 21 is preferrably arranged to produce a horizontal and rectilinear reciprocating vibrating movement, although a circular horizontal movement or a vertical reciprocating movement can also be conceived.

The outer diameter of the annular flange 13 of the sleeve 11 is slightly greater than the diameter of the opening 5 and the flange is intended to abut the edge 7 of the opening 5 when the insert unit 9 is placed in the container 1 to take the position shown in the FIGURE. The diameter of the plate 19 is smaller than that of the opening 5, and hence the plate can be readily passed through the opening when the insert unit 9 is placed in the container 1.

The diameter of the plate 19 is slightly larger than that of a circular opening 23 located at the bottom of the sleeve 11 and is arranged at a determined, adjustable distance therefrom, said distance being determined by the particle size of the food. Means for adjusting the distance between the opening in the insert unit and the plate dependent upon the particle size of the food material is provided, as via the screw which secures the vibrating portion 21 to the plate 19. When the vibrator 15 is activated, the plate 19 is also vibrated and the food in sleeve 11 and in the container 1 is dispensed to the fish, over the edge of the plate. When the vibrator is inactive the food lies against the plate and will not normally fall over its edge.

The side of the plate 19 facing said opening may be provided with a diamond pattern, formed by horizontal grooves extending at right angles to each other over the whole area of the plate. The purpose of these grooves is to distribute the food uniformly over the plate upon activation of the vibrator 15, and therewith upon the oscillation of said plate, so that the food is evenly dispensed over the edge thereof. The pattern provided on said plate and the distance between the opening 23 and the plate 19 are both contributory to holding the food on the plate when the vibrator is inactive. The diamond pattern on the plate 19 is not restrictive of the apparatus according to the invention and the plate surface may be profiled in any appropriate manner and/or be provided with perforations. In the lower portion of the sleeve 11 there is provided a hole through which an adjusting device may be inserted, said device in the illustrated embodiment having the form of a screw 25. The purpose of the adjusting device is to regulate the length of stroke of the vibrating portion 21, thereby to control the amount of food dispensed from the container 1 per unit of time. When the vibrator 15 is activated the portion 21 of the illustrated apparatus effects a reciprocating movement in the longitudinal direction of the screw 25. The distance moved by the vibrator can be decreased by screwing in the screw 25 and increased by screwing out said screw. When the screw 25 is completely screwed in the portion 21 will not move at all, while when the screw 25 is removed from the movement path of the portion said portion will not be impeded and is able to effect its maximum working stroke.

Instead of the screw 25, the adjusting device may comprise a rheostat (not shown) attached to the wall of the container 1, said rheostat being electrically connected to the vibrator 15, which includes an electric motor, and to a suitable source of electric current, to enable the oscillatory movement of the vibrator to be varied according to the particle size of the food, so that said food is uniformly and quantitatively dispensed. The rheostat may also comprise a switch for making and breaking the current to the vibrator 15. Suitably a plurality of feed containers 1 are connected to a central electrical unit in a manner such that all the rheostats of the containers, and thus also the vibrators 15 thereof, can be energized by the actuation of the switch arranged in said unit. The unit may also include a rheostat arranged to regulate the supply of current to all the vibrators 15. By arranging separate rheostats on each container 1, there can be dispensed from each container a quantity of food which is adapted to the number and size of the fish in said container, despite the fact that the dispensing of the food is controlled centrally from a unit located at a distance from the feed containers.

The aforedescribed inserts 9 may be manufactured as a separate unit. The size of the insert is small in relation to the size of the container 1 and hence the costs involved in maintaining and transporting a plurality of inserts is very low. The purchaser of an insert can himself select the container which he considers suitable to accommodate the insert. The only measure required is one of making a circular hole in the bottom of the container, the diameter of the hole being slightly smaller than the outer diamter of the annular flange 13.

Although the invention has been described with reference to a particular embodiment thereof, it is not restricted thereto but can be modified within the scope of the following claims.

I claim:

1. An apparatus for dispensing animal food in powder, granular or lump form comprising: a container having a top, a side wall, and a bottom, and an opening in the bottom thereof, an insert detachably arranged and suspended in said opening and extending therebelow, said insert having an opening in the bottom thereof communicating with the food in the container, said insert including a sleeve, a vibrator within and at least partially surrounded by said sleeve, said sleeve defining an upper sleeve opening and a lower sleeve opening, a vibrating portion fixedly mounted to said vibrator, a food dispensing plate mounted to said vibrating portion, said food dispensing plate being located at a predetermined distance beneath said lower sleeve opening, the area of said plate exceeding the area of said lower sleeve opening, so that the food on the plate will be dispensed over the peripheral edge thereof only when said vibrator is activated.

2. An apparatus according to claim 1, wherein said vibrating portion is mounted to move said plate substantially in a horizontal plane.

3. An apparatus according to claim 2, wherein said vibrating portion is mounted to move said plate circularly in a horizontal plane.

4. An apparatus according to claim 1, wherein said vibrator is mounted immediately above said lower sleeve opening.

5. An apparatus according to claim 1, wherein said container side wall adjacent the opening in said container bottom is inwardly conical.

6. An apparatus according to claim 1, wherein said sleeve is of conical configuration, and wherein said lower sleeve opening faces said food dispensing plate.

7. An apparatus according to claim 6, wherein upper sleeve opening is larger than is said lower sleeve opening and wherein said upper sleeve opening is encircled by an outwardly extending annular flange resting upon the edge of said container bottom adjacent the bottom opening in said container.

8. An apparatus according to claim 1, wherein said plate is circular and the diameter of said plate is smaller than that of the diameter of said bottom opening of said container.

9. An apparatus according to claim 1, including a rheostat for varying the frequency of the vibratory movement of said vibrating portion.

10. An apparatus according to claim 1, wherein the movement of said vibrating portion is limited and adjustable by manually actuatable setting means.

11. An apparatus according to claim 10, wherein said setting means comprises a screw which is detachably adjustably secured to said insert.

12. An apparatus according to claim 11, wherein one end of said screw is arranged to directly engage said vibrating portion, and the other end of the screw is provided with a gripping portion for manual manipulation thereof.

13. An apparatus for dispensing animal food in powder, granular or lump form comprising; a container having a side wall and a bottom, and an opening in the bottom, a vibrator within said container, a vibrating portion fixedly mounted to said vibrator, a food dispensing plate mounted to said vibrating portion, said food dispensing plate being located at a predetermined distance beneath said opening, the area of said plate exceeding the area of said opening, so that the food on the plate will be dispensed over the peripheral edge thereof only when said vibrator is activated, a manually actuatable setting means adjacent the vibrator and engaging said vibrating portion so that the vibratory movement thereof can be adjusted in order to control the amount of food to be dispensed per unit of time over the peripheral edge of said plate.

14. An apparatus according to claim 13 wherein said vibrating portion is mounted to move said plate substantially in a horizontal plane.

15. An apparatus according to claim 13 wherein said container side wall adjacent the opening is inwardly conical.

16. An apparatus according to claim 13 wherein said setting means comprises a screw which is threadedly mounted on said container means and which may be moved towards and away from said vibrating portion.

17. An apparatus according to claim 16 wherein one end of said screw is arranged to directly engage said vibrating portion, and the other end of said screw is provided with a gripping portion for manual manipulation thereof.

* * * * *